United States Patent [19]

Tanikawa

[11] 4,025,377
[45] May 24, 1977

[54] METHOD OF PRODUCING A BASEBALL BAT

[76] Inventor: Yukio Tanikawa, No. 7203, Fukumitsumachi, Nishitonami, Toyama, Japan

[22] Filed: Oct. 17, 1974

[21] Appl. No.: 515,717

Related U.S. Application Data

[62] Division of Ser. No. 451,377, March 14, 1974.

[52] U.S. Cl. .............................. 156/242; 156/294; 273/72 A
[51] Int. Cl.² ......................................... A63B 59/06
[58] Field of Search ............ 156/148, 149, 77, 78, 156/79, 245, 293, 294, 242; 273/26 B, 72 R, 72 A, 82 A; 264/46.4, 46.6, 46.7

[56] References Cited

UNITED STATES PATENTS

| 805,132 | 11/1905 | Gubbins | 273/72 R |
|---|---|---|---|
| 3,093,162 | 6/1963 | Reiling | 156/294 |
| 3,265,401 | 8/1966 | Spier | 273/72 A |
| 3,336,426 | 8/1967 | Boggs | 273/73 F |
| 3,353,258 | 11/1967 | Barton et al. | 273/82 A |
| 3,367,656 | 2/1968 | Medvey | 273/82 R |
| 3,727,295 | 4/1973 | Gildemeister | 273/72 A |

FOREIGN PATENTS OR APPLICATIONS

727,492  2/1966  Canada ............................. 273/82 A

*Primary Examiner*—Caleb Weston
*Attorney, Agent, or Firm*—Wenderoth, Lind & Ponack

[57] ABSTRACT

A method of producing a baseball bat in which the barrel or hitting portion of the bat is molded from synthetic resin and is affixed to a wooden grip or handle portion. An apertured metal tube is fitted over the barrel portion and synthetic resins are foamed through the apertures to bind the metal tube to the barrel portion. The synthetic resin is further smoothed over the entire metal tube and barrel portion. Then, a winding of glass fibers or a stocking of knitted glass fibers may be wound or fitted over the metal tube and barrel portion and painted with a synthetic resin paint which is allowed to permeate the fibers. The synthetic resin may be urethane foam, and the metal duralumin, and the windings or knitted stocking may have a textured surface which will enhance the ability of the bat to prevent foul balls.

5 Claims, 4 Drawing Figures

METHOD OF PRODUCING A BASEBALL BAT

This is a divisional application of Ser. No. 451,377 filed Mar. 14, 1974.

BRIEF SUMMARY OF THE INVENTION

This invention relates to a bat used in baseball and a method of producing the bat.

a. The baseball bat of this invention, having a metal tube of suitable quality for batting a ball arranged at the batting or barrel portion of a main member can lengthen the flight of a ball at the time of a batting, and because the metal tube and the main member are covered with a cloth of glass fiber or other chemical fiber, the bat also can prevent the batter from becoming numb from the shock caused by batting the ball which is transmitted to him through the bat by absorbing this shock in the cloth. Moreover, the bat is sturdy.

b. According to the method of the invention, since the metal tube is set and fixed around the barrel portion of the main member, it is easy to operate and when urethane foam or other synthetic resin material is adopted for the main member, it is possible to fix the metal tube with many apertures and filling these apertures with the same material as in the main member. Besides this, since the metal tube and the main member are covered with a cloth of glass fiber or other chemical fiber or wound with the strings of these fibers to form the outer layer, a very tough bat will be obtainable and the projections formed on the outer layer will help to eliminate fouls and tips.

DETAILED DESCRIPTION OF THE INVENTION

The present relates to a baseball bat. It is an object of the present invention to provide a bat used in baseball which can lengthen the flight of a ball when properly hit.

Another object of the present invention is to provide a bat which can prevent a batter's hands and arms from becoming numb due to the shock caused by batting the ball and transmitted to him through the bat.

A further object of the present invention is to provide a bat which is sturdy and is easy to produce.

A still further object of the present invention is to produce a baseball bat which will help to eliminate fouling and tipping.

Figure 1:
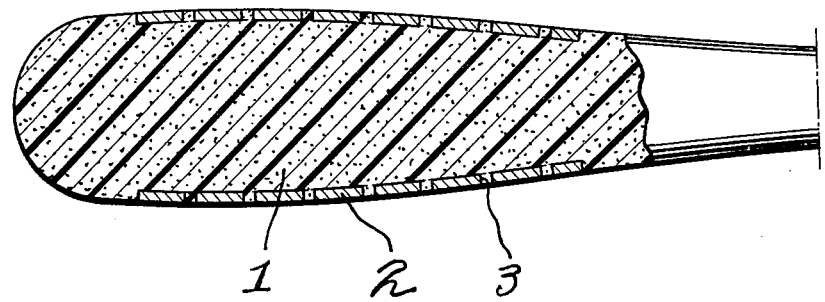
FIG. 1 is a partial section view showing one principal part of a baseball bat embodying the present invention.
Figure 1:
Figure 2:
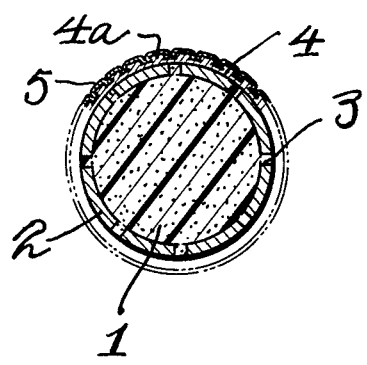
FIG. 2 is a transverse section view along the line 2—2 of FIG. 1 showing the construction of the invention.
Figure 3:
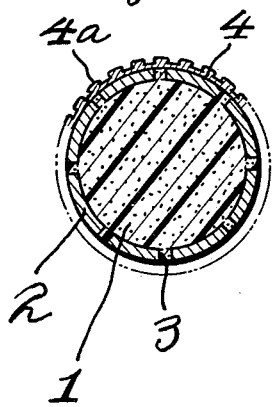
FIG. 3 is another embodiment thereof.
Figure 4:
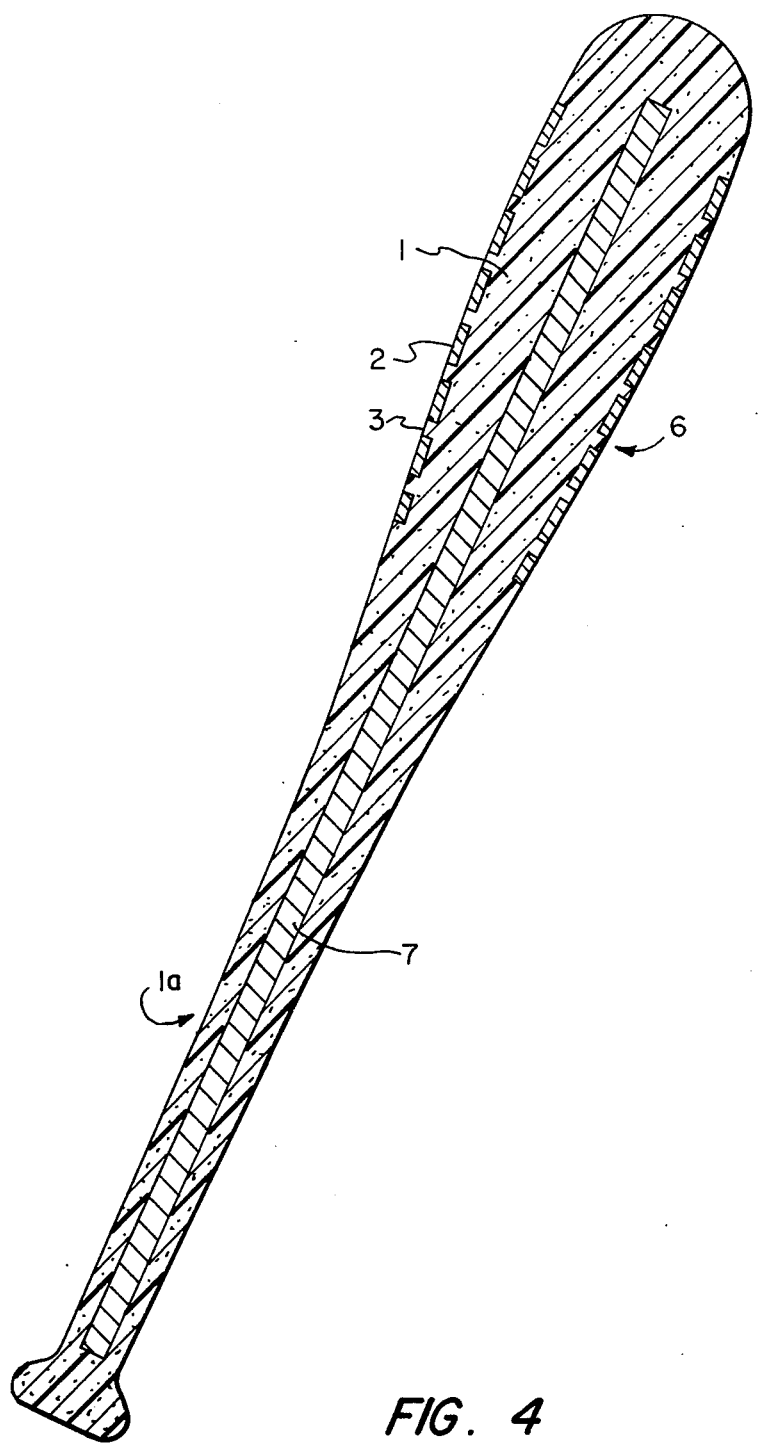
FIG. 4 is a sectional view showing a wooden core in the bat of the present invention.

Referring now to the drawings explaining the invention, a main member 1 has a barrel portion 6 connected to a handle or grip portion 1a. The main member 1 is made of urethane foam or other foamed resin. For the grip portion 1a of the bat, a balsam core 7 is especially suitable. The balsam core 7 also may be extended longitudinally from the grip portion 1a into the barrel portion 6 as shown in FIG. 4. A metal tube 2 of spring steel or duralumin is provided with many apertures 3 and is only fixed to the barrel portion of the main member 1, and the junction of the surfaces over the metal tube 2 and the main member 1 is smoothed. The apertures 3 are filled with urethane foam. An outer layer 4 is formed by winding the main member 1 and the metal tube 2 with strings of glass fiber. This outer layer 4 may also be formed by a roving sheet, or otherwise, by covering the main member 1 and the metal tube 2 with material in the form of a sack or a stocking using a knitted cloth of glass fiber. This forming process may provide projections 4a resulting from the means of knitting at regular or irregular or otherwise suitable intervals on the surface of the upper layer 4. Not only glass fiber but also general chemical fiber or other suitable tough fiber may be adopted as the material for the strings or the cloth which forms the outer layer 4. Finally, a synthetic resin paint is spread over the outer layer 4 and permeated into it, thus creating a paint layer 5. Referring again to the drawings to explain the method of producing said bat: the main member 1 is shaped from synthetic resin such as urethane foam, wood or both by molding or by means of a mechanical cutting. Then a metal tube 2 of spring steel, duralumin or other metal with suitable quality for batting a ball is fixed to the barrel portion of the main member 1, and the metal tube is drilled to provide many apertures therein. These apertures are filled with urethane foam or other synthetic resin material thereby making it possible to smooth the surface over the main member and the metal tube. The main member 1 and the metal tube 2 are next covered with a glass fiber cloth 4 or other chemical fiber cloth or a winding which wraps both of them in strings of these fibers, for instance, by means of forming a roving sheet. To form an outer layer over the fibers 4 paint and the like is spread over the surface of the outer layer 4 and the main member 1. Projections on the outer layer 4 may be provided at regular or at irregular intervals by means of a general forming step, for instance, by knitting.

The accompanying drawings illustrate the bat produced by the process of the present invention. The main member 1 is made of urethane foam or other foamed resin by pressing the synthetic resin material into a mold. In this shaping process by pressing, a balsam core 7 is adopted for a grip portion 1a of the main member 1, and is fixed in the main member 1 by the synthetic resin material. The balsam core 7 may be further adopted as a core material which extends longitudinally through the grip portion 1a into the barrel portion 6. The metal tube 2 of spring steel or duralumin is provided with many apertures 3, and is arranged at the barrel portion 6 in the shaping process by pressing. The metal tube 2 is fixed to the main member 1 by foaming urethane foam material through the apertures 3 and smoothing the joint. The apertures 3 are then filled with urethane foam. The main member 1 and the metal tube 2 are wound and covered with the strings of glass fiber to form the outer layer 4. The outer layer 4 is formed for instance by making a roving sheet or by covering the main member 1 and the metal tube 2 with a stocking type sack knitted from said fibers. In this process, it is possible to knit projections 4a which will be positioned at regular or at suitable intervals on the surface of the outer layer 4. By spreading the synthetic resin paint over the outer layer 4 and the projections 4a, a paint layer 5 is formed and as the occasion demands, the paint may permeate into the outer layer 4, projections 4a and the main member 1. The projections 4a will still include projection lines.

The use of this bat is the same as for general bats. According to the bat of the present invention, it having a metal tube of suitable quality for batting a ball at the barrel portion 6, the flight of a batted ball will be lengthened. Besides this, by having the outer layer 4 formed by covering the main member 1 and the metal tube 2 with the cloth of glass fiber or other chemical fiber or a winding of the strings of these fibers, the shock caused by batting a ball which is transmitted to a batter through a bat is absorbed into the outer layer 4 and he is not or is only slightly numbed by the shock. This bat is furthermore tough enough as a bat used in baseball and when the projections are provided on the outer layer, it eliminates fouling and tipping.

The reason for placing the metal tube at the barrel portion of the bat is to satisfactorily lengthen the flight of a batted ball and the reason why the outer layer 4 is so formed is to absorb the shock caused by hitting the ball and to prevent it from being transmitted to a batter. When the projections are formed on the outer layer, they prevent the ball from sliding and, consequently, result in a bat which will refuse to cause fouling and tipping when a ball is hit.

I claim:

1. A method of producing a baseball bat comprising the steps of:
   molding a main bat member having a barrel portion for hitting a baseball and a grip portion integral with said barrel portion from foamable synthetic resin around a wooden core longitudinally through at least said grip portion;
   surrounding and fitting to said barrel portion an apertured metal tube;
   foaming synthetic resin of the same type as comprises said main bat member through the apertures in said apertured metal tube and smoothing said synthetic resin over said metal tube and said barrel portion;
   wrapping said synthetic resin covered metal tube and barrel portion with strings of chemical fibers; and
   spreading a coating of synthetic resin paint over said wrapping of chemical fiber strings and allowing said paint to permeate therethrough.

2. A method as claimed 1, wherein: said synthetic resin is urethane foam; said wooden core is balsam wood; and said chemical fibers are glass fibers.

3. A method as claimed in claim 1, wherein:
   said strings of chemical fibers wrapped about the surface of said metal tube and said barrel portion form projections rising above the surface thereof.--

4. A method as claimed in claim 1, wherein:
   said strings of chemical fibers wrapped around said metal tube and said barrel portion are in the form of a knitted stocking covering said tube and barrel portion.

5. A method as claimed in claim 4, wherein:
   said stocking is knitted from said strings of chemical fibers with projections rising above the surface thereof.

* * * * *